(12) United States Patent
Ringer et al.

(10) Patent No.: US 9,834,051 B1
(45) Date of Patent: Dec. 5, 2017

(54) VEHICLES CONFIGURED FOR REMOVABLE ATTACHMENT OF IMPLEMENTS

(71) Applicant: Ring-Co Transit, LLC, Trafalgar, IN (US)

(72) Inventors: Chad A. Ringer, Trafalgar, IN (US); Jarrett D. Waters, Camby, IN (US)

(73) Assignee: Ring-Co Transit, LLC, Trafalgar, IN (US)

( * ) Notice: Subject to any disclaimer, the term of this patent is extended or adjusted under 35 U.S.C. 154(b) by 0 days.

(21) Appl. No.: 15/074,804

(22) Filed: Mar. 18, 2016

Related U.S. Application Data

(60) Provisional application No. 62/136,275, filed on Mar. 20, 2015.

(51) Int. Cl.
*B60R 19/04* (2006.01)
*B60D 1/52* (2006.01)
*B60R 19/24* (2006.01)

(52) U.S. Cl.
CPC ............... *B60D 1/52* (2013.01); *B60R 19/24* (2013.01)

(58) Field of Classification Search
CPC .................................. B60D 1/52; B60R 19/24
See application file for complete search history.

(56) References Cited

U.S. PATENT DOCUMENTS

| | | | | |
|---|---|---|---|---|
| 5,061,108 A | * | 10/1991 | Bien | B60R 19/24 296/191 |
| 5,273,330 A | * | 12/1993 | Petry | B60R 19/26 293/132 |
| 8,562,013 B1 | * | 10/2013 | Wentz, Jr. | B60D 1/52 280/495 |
| 2005/0168327 A1 | * | 8/2005 | De Wilde | B60D 1/64 340/431 |
| 2010/0133860 A1 | * | 6/2010 | Roth | B60R 19/48 293/120 |
| 2010/0199879 A1 | * | 8/2010 | Graaff | B60F 1/046 105/215.2 |

* cited by examiner

*Primary Examiner* — Lori L Lyjak
(74) *Attorney, Agent, or Firm* — Taft Stettinius & Hollister LLP

(57) ABSTRACT

A quick-attach mechanism for attaching an implement to the forward end and/or rearward end of a vehicle, such as a tractor used in a tractor-trailer combination, and the like. The quick-attach mechanism includes two laterally positioned female quick-attach sockets on the forward and/or rearward end of said vehicle. The quick-attach mechanisms can be formed into the chassis of the vehicle.

17 Claims, 16 Drawing Sheets

SECTION A-A

DETAIL C

DETAIL B

VEHICLES CONFIGURED FOR REMOVABLE ATTACHMENT OF IMPLEMENTS

CROSS REFERENCE TO RELATED APPLICATIONS

This application claims the benefit of U.S. Provisional Application No. 62/136,275 filed Mar. 20, 2015, the disclosure of which is incorporated herein by reference in its entirety.

FIELD OF THE DISCLOSURE

The present invention relates to devices and methods for attaching implements to the forward end and/or rearward end of a vehicle, such as, for example, a tractor used in a tractor-trailer combination.

BACKGROUND

A wide variety of vehicles are commercially available that are designed for a specific function or purpose. For example, a tractor used in a tractor-trailer combination is configured for connection to a trailer for transport of materials over roadways, often over long distances. However, when such tractors are not being used for towing trailers, they often sit idle as they are not designed to be put to other uses.

Terminal tractors (also referred to as spotting tractors, shunt trucks, terminal trucks, yard trucks, yard goats, yard dogs, yard jockeys, or mules) are shortened versions of a conventional fifth-wheel truck and have a hydraulic lift coupled to the fifth wheel that is controllable by the operator from the truck cab. The operator can couple the fifth wheel to a trailer and engage the hydraulic lift to raise a front stand of the trailer off the underlying surface to allow movement of the trailer. The ability to raise the front stand of the trailer off the underlying surface from the truck cab allows easier and faster movement of the trailers because the operator does not have to separately raise the front stand of the trailer after it is coupled to the fifth wheel. Terminal tractors often are configured for relatively slow speeds to facilitate the movement of cargo in relatively limited space. Terminal trucks are often not capable of travelling on public roads because of their limited vehicle speed.

There is an ongoing need for more efficient and versatile use of tractors of the type used in a tractor-trailer combination and the like. For example, there is a need for a convenient way for such a tractor to be employed for other uses when it is not being employed to pull a trailer, such as, for example, utilization of the tractor for snow removal, deicing, road repair or for use in combination with a wide variety of other implements that are commercially available. The present disclosure addresses this need.

SUMMARY OF THE INVENTION

The present invention provides novel vehicle designs and, in particular, tractor designs, that provide a quick-attach system that does not detract from the tractor's primary trailer-hauling purpose.

In one aspect, the present disclosure provides a vehicle, such as a tractor used in a tractor-trailer combination, a terminal tractor, and the like, having a chassis that includes features for quickly attaching an implement having complementary structures, and likewise for quickly detaching the implement when it is desired to put the vehicle to another use without the implement. For example, in addition to performing the traditional duties of said tractor, the attachment of particular implements would enable the use of the tractor for performing other tasks on a temporary basis, such as snow removal, deicing, and road repair. Alternative implements that could be attached to the vehicle include, for example and without limitation, buckets, forks, grader boxes and lawn maintenance equipment. The ability of the vehicle to perform many tasks above and beyond the original purpose for which it was primarily designed is advantageous to the owner.

In one embodiment, the present disclosure provides a vehicle that includes an implement receiver in the form of a female quick-attach socket formed directly into the chassis at the forward end of the vehicle. In one embodiment, the receiver for a quick-attach implement is formed into the forward end bumper of the vehicle chassis.

In another embodiment, the present disclosure provides a vehicle that includes an implement receiver in the form of a female quick-attach socket formed into the chassis at the rearward end of the vehicle. In one embodiment, the receiver for a quick-attach implement is formed into the rearward end bumper.

In yet another embodiment, the present disclosure provides a vehicle that includes a first implement receiver in the form of a female quick-attach socket formed into the chassis at the forward end of the vehicle and a second implement receiver in the form of a female quick-attach socket formed into the chassis at the rearward end of the vehicle. In one embodiment, the first receiver is formed into the forward end bumper. In another embodiment, the second receiver is formed into the rearward end bumper. In yet another embodiment, the first receiver is formed into the forward end bumper and the second receiver is formed into the rearward end bumper.

In still another embodiment, an implement is secured to a receiver with a pin. In this embodiment, the chassis structure defining a receiver also defines aligned openings positioned, sized and configured to align with complementary openings formed in the attachment mechanism inserted into the receiver. In this embodiment, when the female socket of the quick-attach system is mated with the male mechanism of an implement, a pin or bolt can be passed through the aligned openings defined in the receiver and in the male mechanism of the implement to secure the implement to the vehicle.

In one aspect of the disclosure, there is provided an implement attachment system for a terminal tractor, the mechanism comprising a chassis with a forward end and a rearward end and a first female quick-attach socket and a second female quick-attach socket spaced laterally from one another and coupled to the chassis at the forward end or the rearward end. The first and second female quick-attach sockets are sized to receive first and second male members. In one embodiment, each of the first and second female quick-attach sockets defines a substantially square-shaped aperture therein. In another embodiment, the first and second male members are fixed relative to the frame when the first and second male members are coupled to the respective first and second female quick-attach sockets.

In yet another embodiment, the implement attachment system has first and second horizontal openings defined in each of the respective first and second female quick-attach sockets, the first and second horizontal openings corresponding to openings formed in the first and second male members. Further, the first and second horizontal openings of each of said first and second female quick-attach sockets are substantially aligned with the corresponding openings formed in the first and second male members when the first and second male members are coupled to the respective first and second female quick-attach sockets. A first pin may be positioned through the first and second openings of the first female quick-attach socket and through the corresponding openings formed in the first male member, and a second pin may be positioned through the first and second openings of the second female quick-attach socket and through the corresponding opening formed in the second male member.

In another embodiment, the implement attachment system includes an implement plate coupled to, and extending between, each of the first and second male members. In yet another embodiment, at least one through-hole is defined in the implement plate, the through-hole providing a location to couple the implement plate to an implement.

In yet another embodiment, the first and second female quick-attach sockets are coupled to the chassis at the forward end and the implement attachment system also includes a third female quick-attach socket and a fourth female quick-attach socket spaced laterally from one another and coupled to the chassis at the rearward end. In one embodiment, the third and fourth female quick-attach sockets also are sized to receive the first and second male members.

In still another embodiment, the first and second female quick-attach sockets are coupled to the chassis through a bumper. In still yet another embodiment, the first, second, third and fourth female quick-attach sockets are coupled to the chassis through a bumper.

In another aspect of the present disclosure, there is provided an implement coupling system that includes a terminal tractor having a chassis with a forward end and a rearward end and a first female quick-attach socket and a second female quick-attach socket spaced laterally from one another and coupled to the chassis at the forward end or the rearward end.

In one embodiment, each of the first and second female quick-attach sockets is defined by a first and second side wall coupled to an upper wall and a lower wall. In another embodiment, each of the first and second female quick-attach sockets defines a substantially square aperture.

In another embodiment, the implement coupling system includes a male attachment mechanism having first and second male members spaced laterally to correspond with the respective first and second female quick-attach sockets. The male attachment mechanism is configured to be coupled to the terminal tractor at the first and second female quick-attach sockets with the first and second male members. In one embodiment, the male attachment mechanism, when coupled to the terminal tractor at the first and second female quick-attach sockets, does not substantially move relative to the chassis. In another embodiment, the male attachment mechanism is coupled to an implement. Examples of such implements include, but are not limited to, a bucket, a fork, a plow, a de-icer, a grader box, or lawn maintenance equipment.

In another embodiment, the first and second female quick-attach sockets are coupled to the chassis at the forward end and a third female quick-attach socket and a fourth female quick-attach socket spaced laterally from one another are coupled to the chassis at the rearward end.

In another aspect, the present disclosure provides a combination that includes a vehicle having a chassis with a forward end and a rearward end, the chassis having formed therein or coupled thereto at the forward end or the rearward end a first female quick-attach socket and a second female quick-attach socket spaced laterally from one another; wherein the first and second female quick-attach sockets are sized to receive a first and second male member; and an implement comprising a male attachment mechanism having first and second male members spaced laterally to correspond with the respective first and second female quick-attach sockets. In alternative embodiments, the vehicle has a chassis with any of the alternative configurations described herein.

In another aspect of the disclosure, there is provided a vehicle that includes a fifth-wheel assembly operable to engage the mating structures on a trailer or other component and the vehicle also having a chassis with a forward end and a rearward end, the chassis having formed therein or coupled thereto at the forward end or the rearward end a first female quick-attach socket and a second female quick-attach socket spaced laterally from one another. The quick-attach sockets in various embodiments of the vehicle can be configured as described in connection with the various embodiments disclosed herein.

In yet another aspect, the present disclosure provides a method of manufacturing an implement attachment system coupled to a chassis of a vehicle that includes providing a bumper for a forward end or a rearward end of the vehicle, the bumper defining a first aperture and a second aperture in the bumper spaced laterally from one another, coupling or otherwise forming a first female quick-attach socket in the bumper, the first female quick-attach socket being defined by a first and second side wall coupled between a top and bottom wall and extending towards a back wall, coupling or otherwise forming a second female quick-attach socket in the bumper, the second female quick-attach socket being defined by a first and second side wall coupled between a top and bottom wall and extending towards a back wall, and aligning the bumper with the chassis of the vehicle and coupling the bumper to the chassis.

Further embodiments, forms, features, and aspects of the disclosure shall become apparent from the following descriptions.

BRIEF DESCRIPTION OF THE FIGURES

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3b is a section view of a portion of the vehicle frame rail assembly of FIG. 3a;

Corresponding reference numerals are used to indicate corresponding parts throughout the several views.

DETAILED DESCRIPTION

Figure 1:
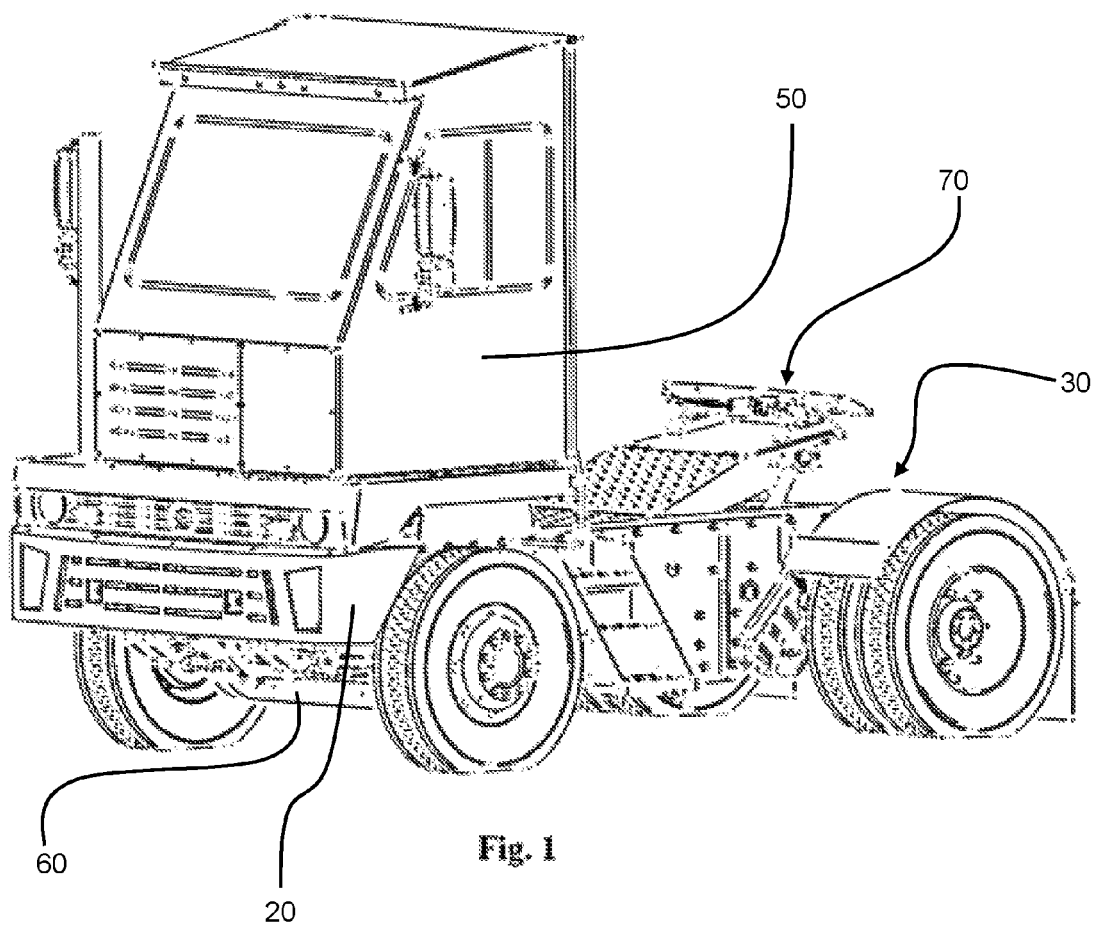
FIG. 1 is an elevated perspective view of one embodiment of the present disclosure on a terminal truck.
Figure 2:
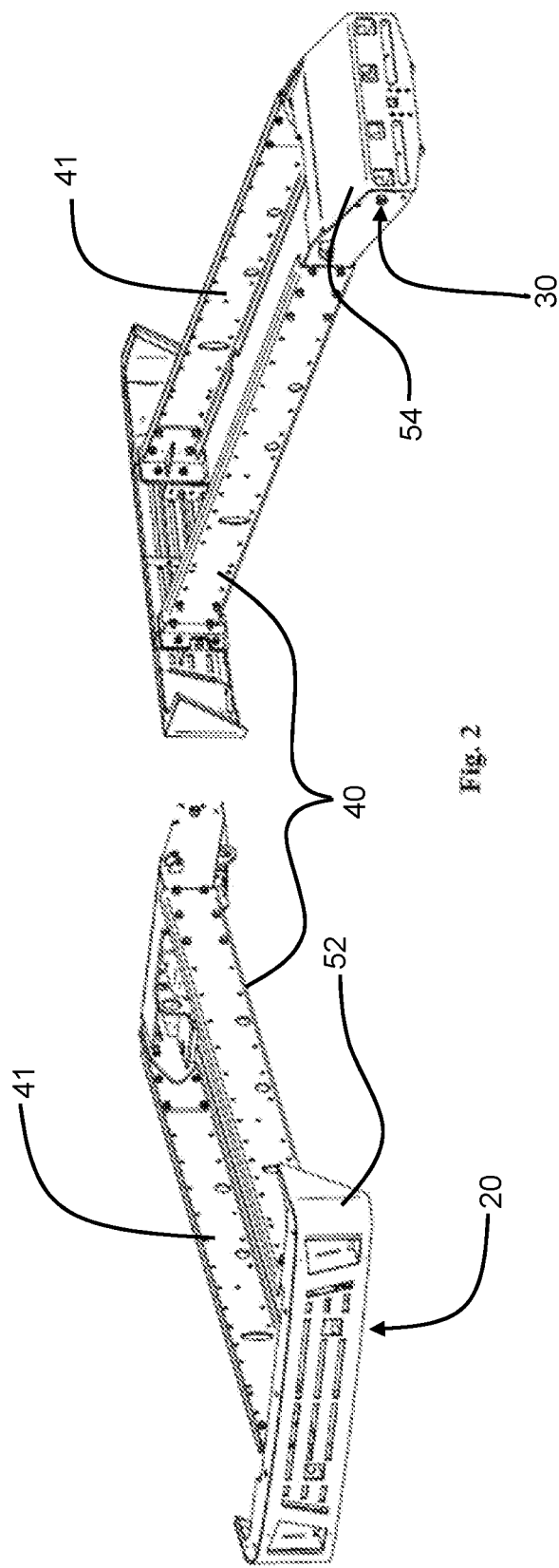
FIG. 2 is front end perspective view of a chassis and front bumper and a rear end perspective view of the chassis and a rear bumper.

For the purposes of promoting an understanding of the principles of the invention, reference will now be made to the embodiments illustrated in the figures and specific language will be used to describe the same. It will nevertheless be understood that no limitation of the scope of the invention is thereby intended. Any such alterations and further modifications in the described devices, systems, processes and methods, and such further applications of the principles of the invention as described herein are contemplated as would normally occur to one skilled in the art to which the invention relates.

With reference to the embodiments depicted in FIGS. 1-12, an implement attachment system is shown and described. More specifically, a female quick-attach mechanism 20 is configured to engage a male attachment mechanism 10 (which is shown without an implement for the sake of clarity). As shown, a first female quick-attach mechanism 20 includes two openings formed into a forward end bumper 52 of a vehicle, terminal tractor, or other work machine and a second quick-attach mechanism 30 includes two openings formed into a rearward end bumper 54 of a vehicle. The vehicle also includes driver's side frame rail 40, curbside frame rail 41, operator enclosure 50, axle assembly 60, and fifth wheel assembly 70.

In the embodiment shown in FIG. 1, the quick-attach mechanisms 20, 30 are shown on a vehicle with a fifth wheel hitch assembly mounted to the vehicle to engage the fifth wheel hitch assembly with the mating structures on a trailer or other component to which the fifth wheel hitch assembly is to be mated. In this embodiment, the quick-attach mechanisms 20, 30 may allow the vehicle to be coupled to a plurality of different implements in addition to utilizing the fifth wheel hitch assembly to engage a trailer. In one non-exclusive example, a plow or other implement is coupled to the female quick-attach mechanism 20 while a trailer is coupled to the fifth wheel hitch assembly. Similarly, in another non-exclusive example the second female quick-attach mechanism 30 may be coupled to an implement when the fifth wheel hitch assembly is not coupled to a trailer.

Figure 3A:
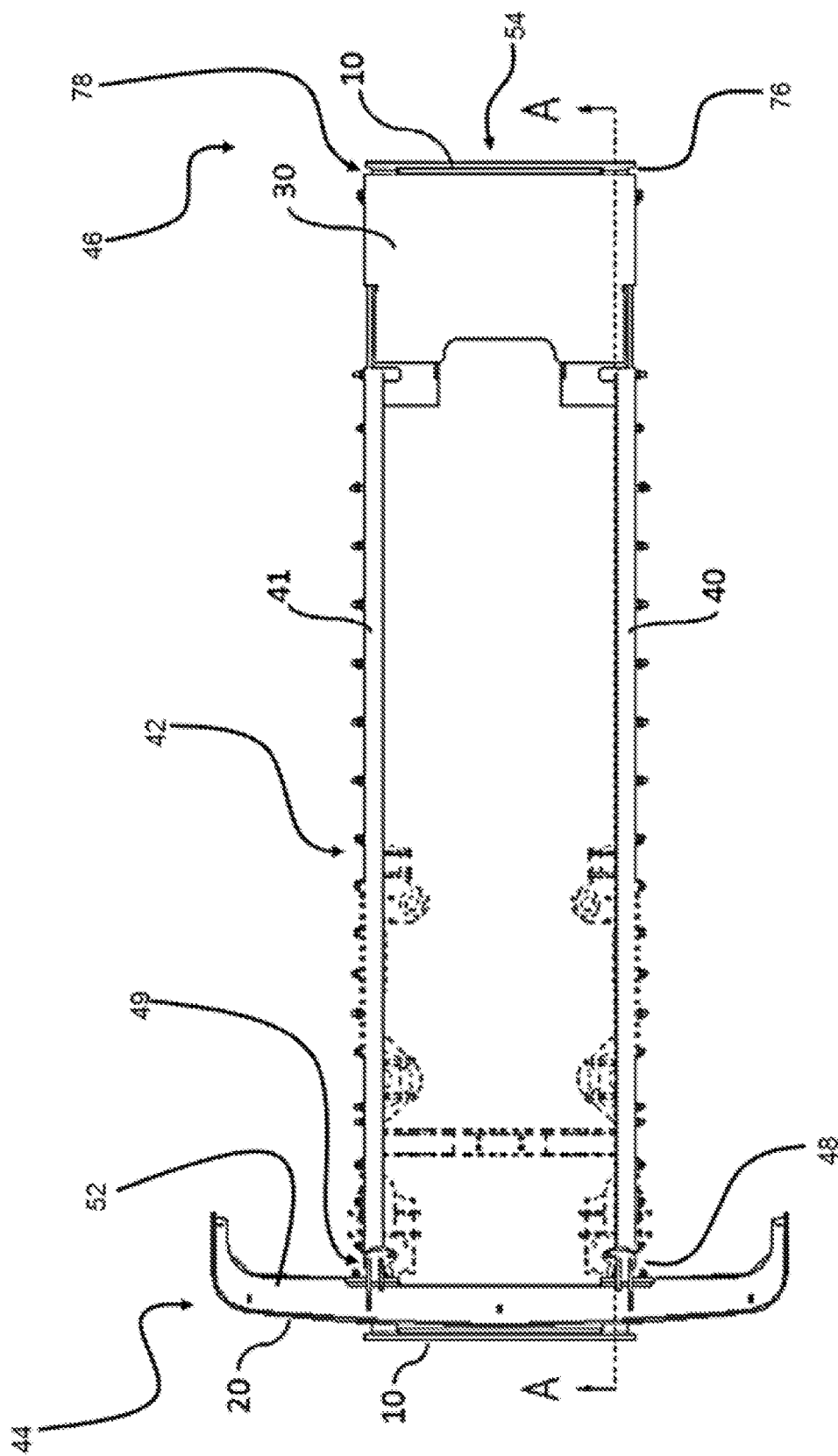
FIG. 3a is a top view of a vehicle frame rail assembly.
Figure 3B:
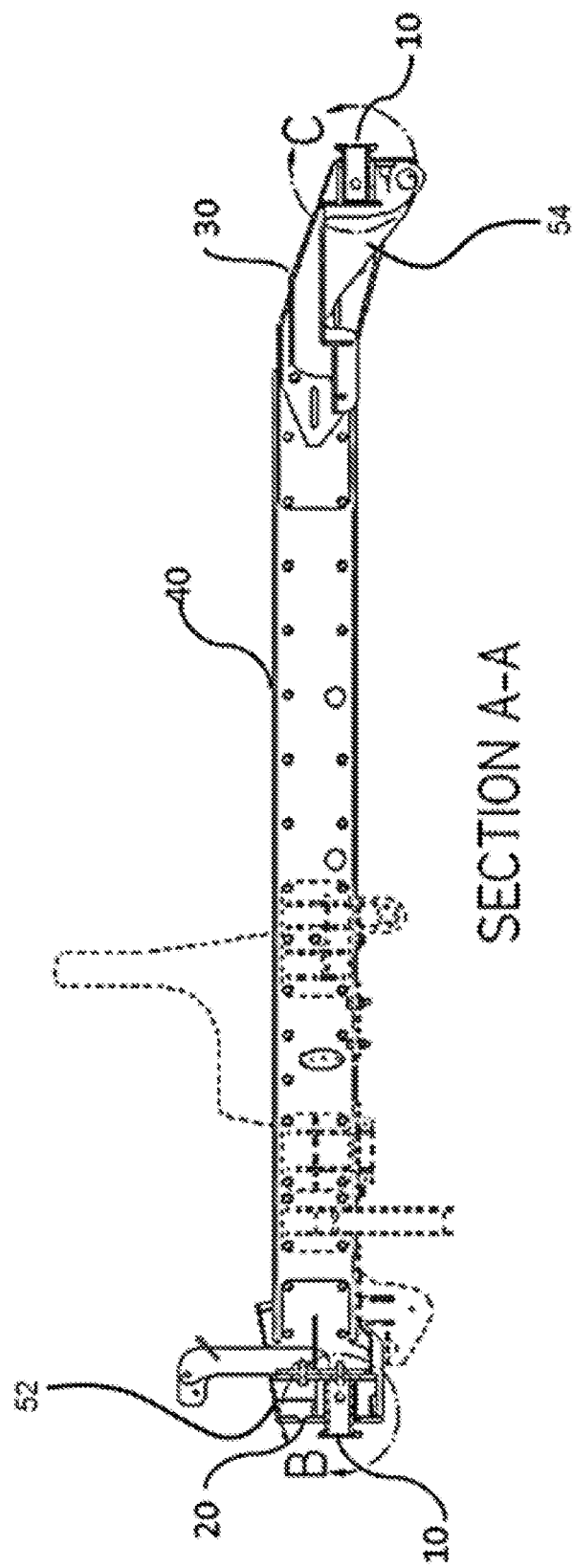
Figure 3D:
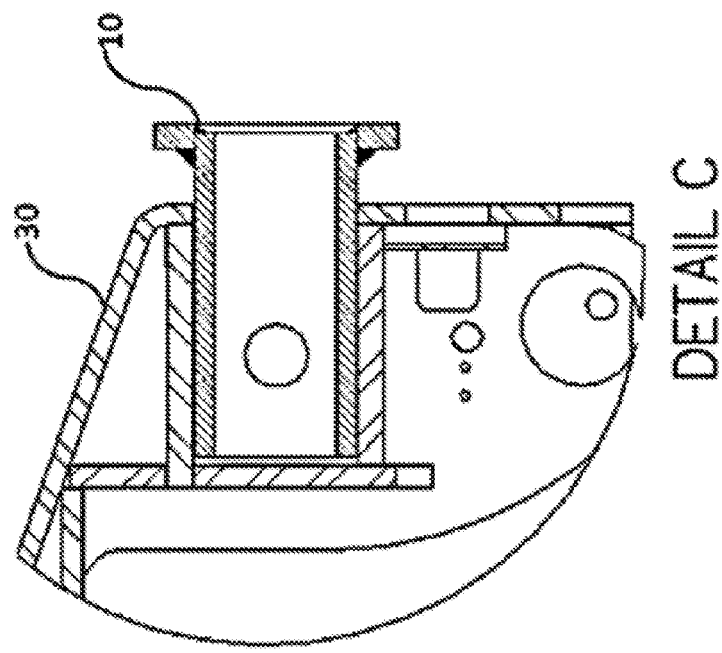
FIG. 3d is a cross sectional view of a rearward end quick-attach mechanism mated to the male attachment mechanism of the implement.
Figure 3C:
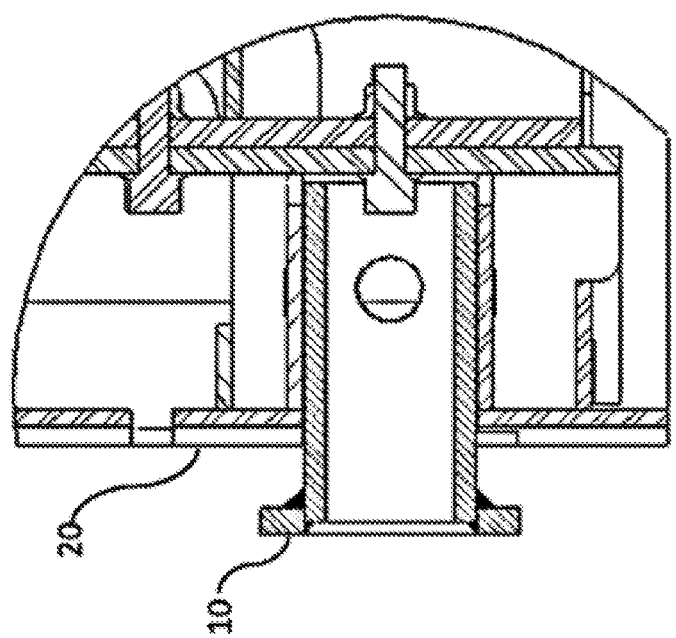
FIG. 3c is a cross sectional view of a forward end quick-attach mechanism mated to a male attachment mechanism of an implement.

With reference to FIG. 3b, SECTION A-A depicts an example of the male attachment mechanism 10, forward end bumper 52 including the female quick-attach mechanism 20, rearward end bumper 54 including the second quick-attach mechanism 30, and driver's side frame rail 40.

Figure 4:
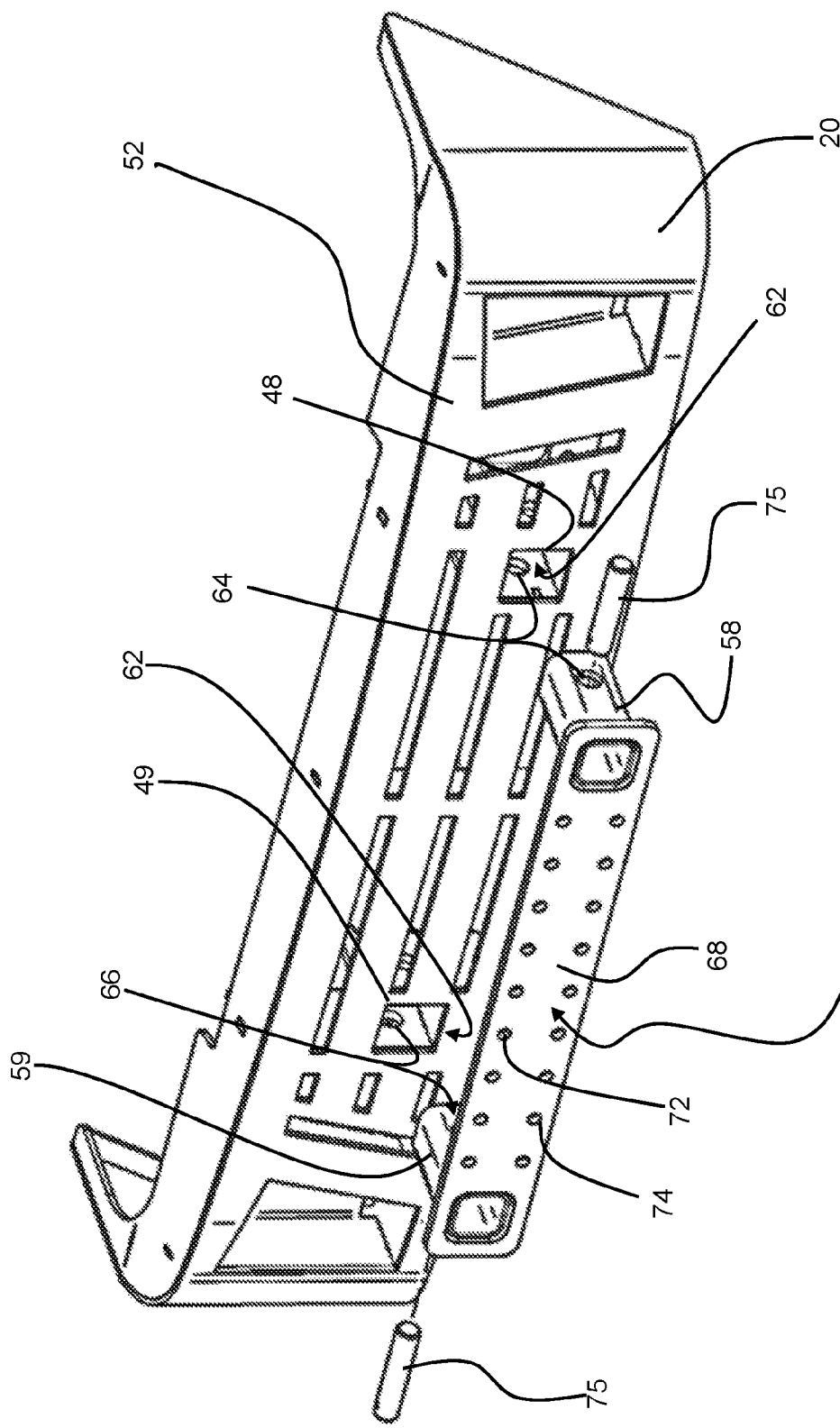
FIG. 4 is a forward end view of a bumper of a vehicle embodiment having a quick-attach mechanism.

With reference to FIG. 4, an example of the male attachment mechanism 10 and the forward end bumper 52 including the female quick-attach mechanism 20 isolated from the respective frame rails 40, 41 is shown. FIG. 1 also shows operator enclosure 50, and axle assembly 60.

The male attachment mechanism 10 may have a first male member 58 and a second male member 59 coupled thereto. In one example, the male attachment mechanism 10 may have an implement plate 68 extending between the first and second male member 58, 59. The first and second male members 58, 59 may extend away from the implement plate 68 and be sized to fit within square-shaped apertures 62 defined by the first and second female quick-attach mechanism 20. The implement plate 68 may also have a first row of through-holes 72 and a second row of through-holes 74 defined therethrough.

In one embodiment, the implement plate 68 may be coupled to any type of implement. More specifically, the first and second row of through holes 72, 74 may provide a coupling location for an implement to be coupled to the implement plate 68 and then be selectively coupled to the vehicle through the implement attachment elements described above. In one aspect of the present disclosure, the male attachment mechanism 10 may be coupled to the female quick-attach mechanism 20, and in turn the chassis 42, to substantially fix the implement to the chassis 42. More specifically, the respective coupling mechanisms 10, 20 may be sufficiently strong when fastened to one another to accommodate implements that will experience substantial loads. In one embodiment, the implement may be a blade or other similar device that can be raised and lowered relative to the underlying surface. In this embodiment, the male attachment mechanism 10 and the female quick-attach mechanism 20 are sufficiently strong to support the weight of the implement when raised from the underlying surface. Further, because the coupling mechanisms 10, 20 are laterally spaced from one another, the angular orientation of the implement relative to the chassis 42 may also be controlled by the implement.

Figure 5:
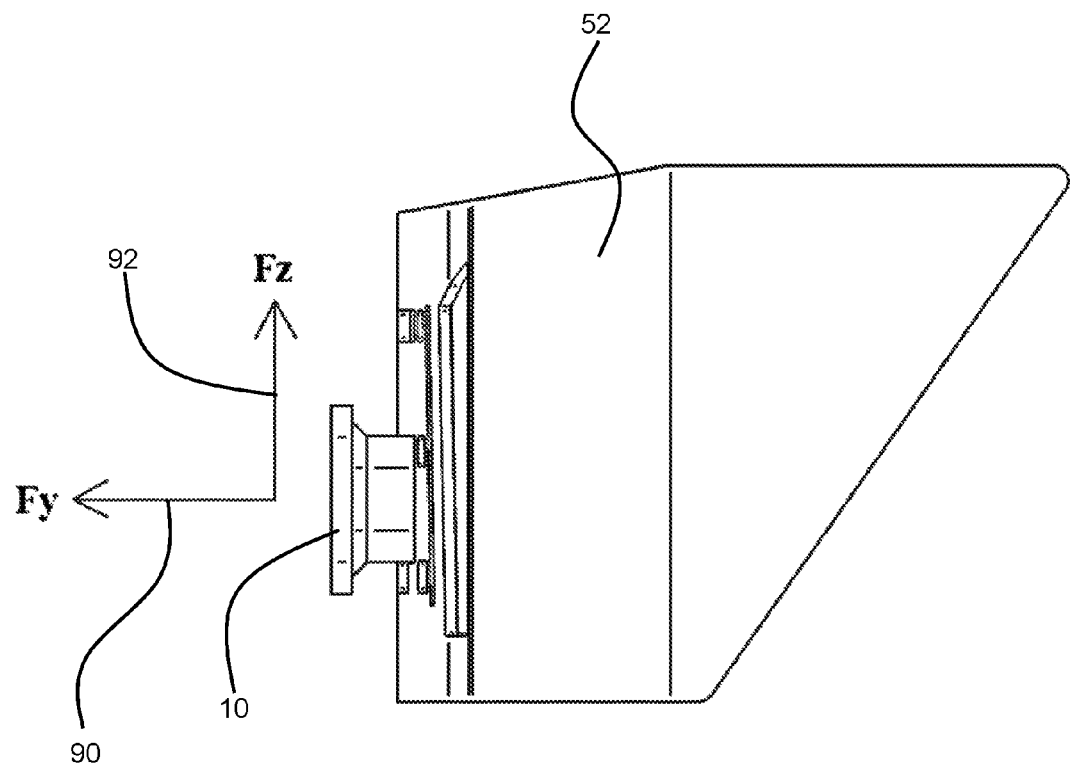
FIG. 5 is an illustrative force diagram of the front bumper of FIG. 4.
Figure 6:
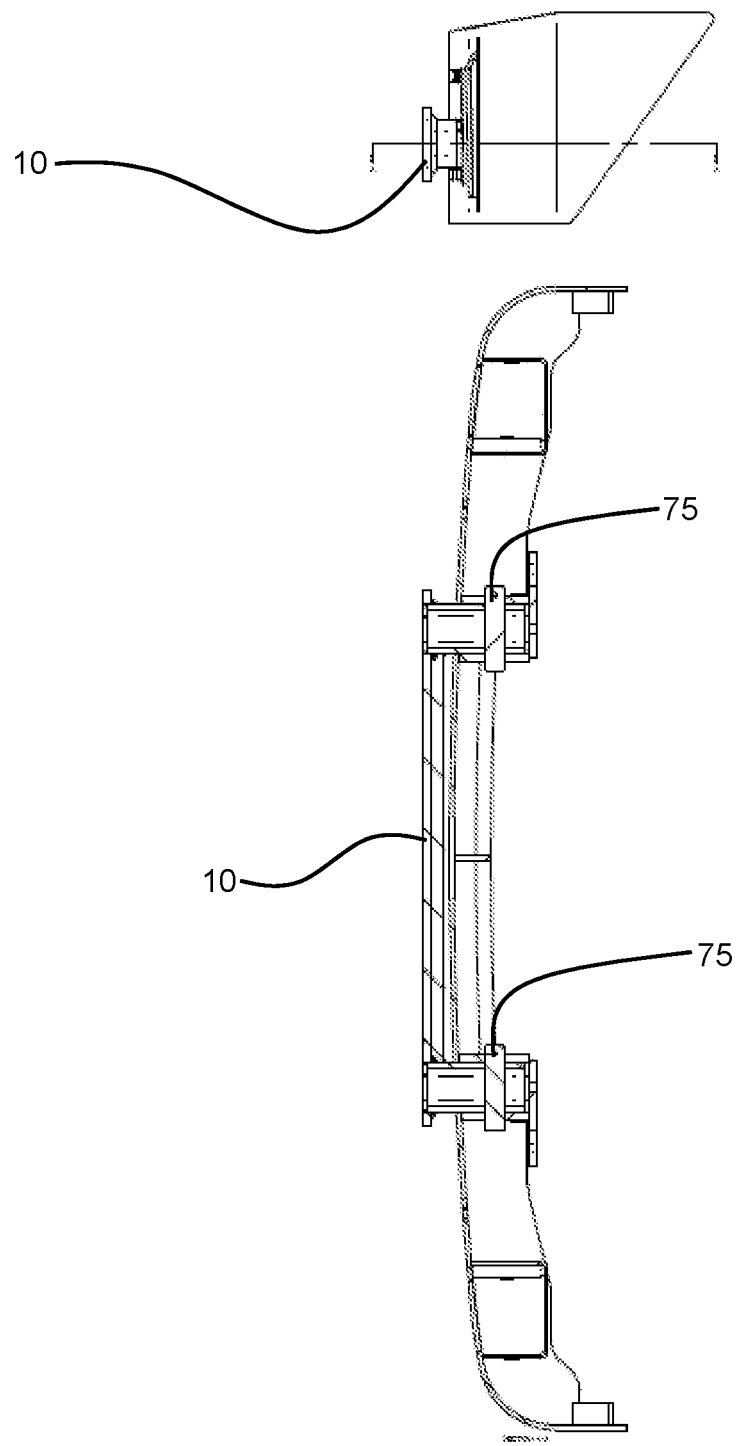
FIG. 6 is a side view and a top section view of the front bumper of FIG. 4.
Figure 7:
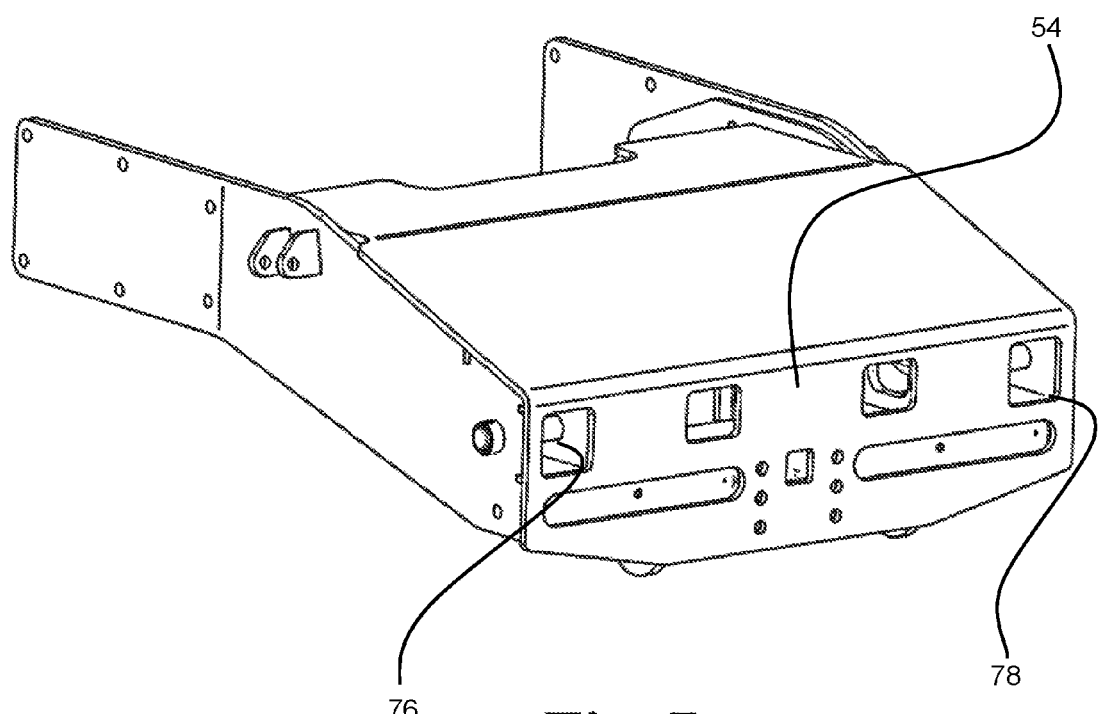
FIG. 7 is a perspective view of the rear bumper isolated from the chassis.
Figure 9:
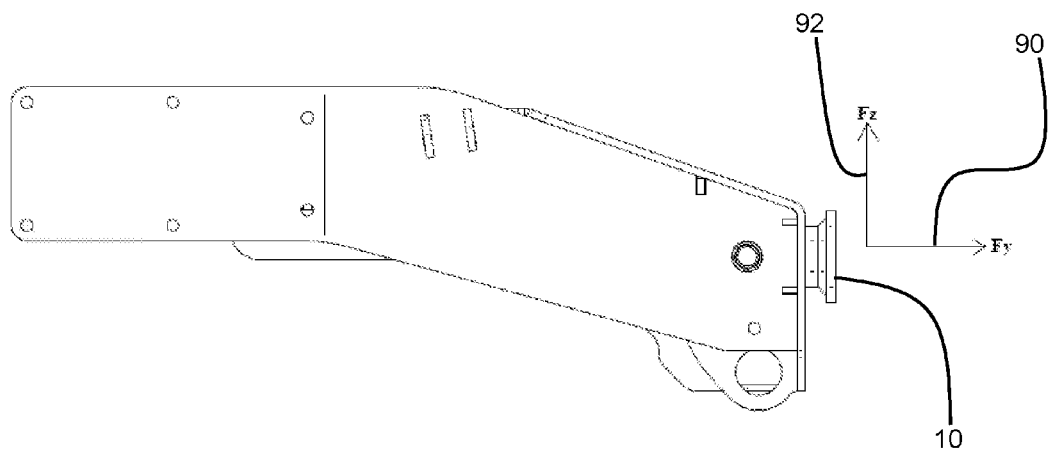
FIG. 9 is an illustrative force diagram of the rear bumper of FIG. 7.
Figure 10:
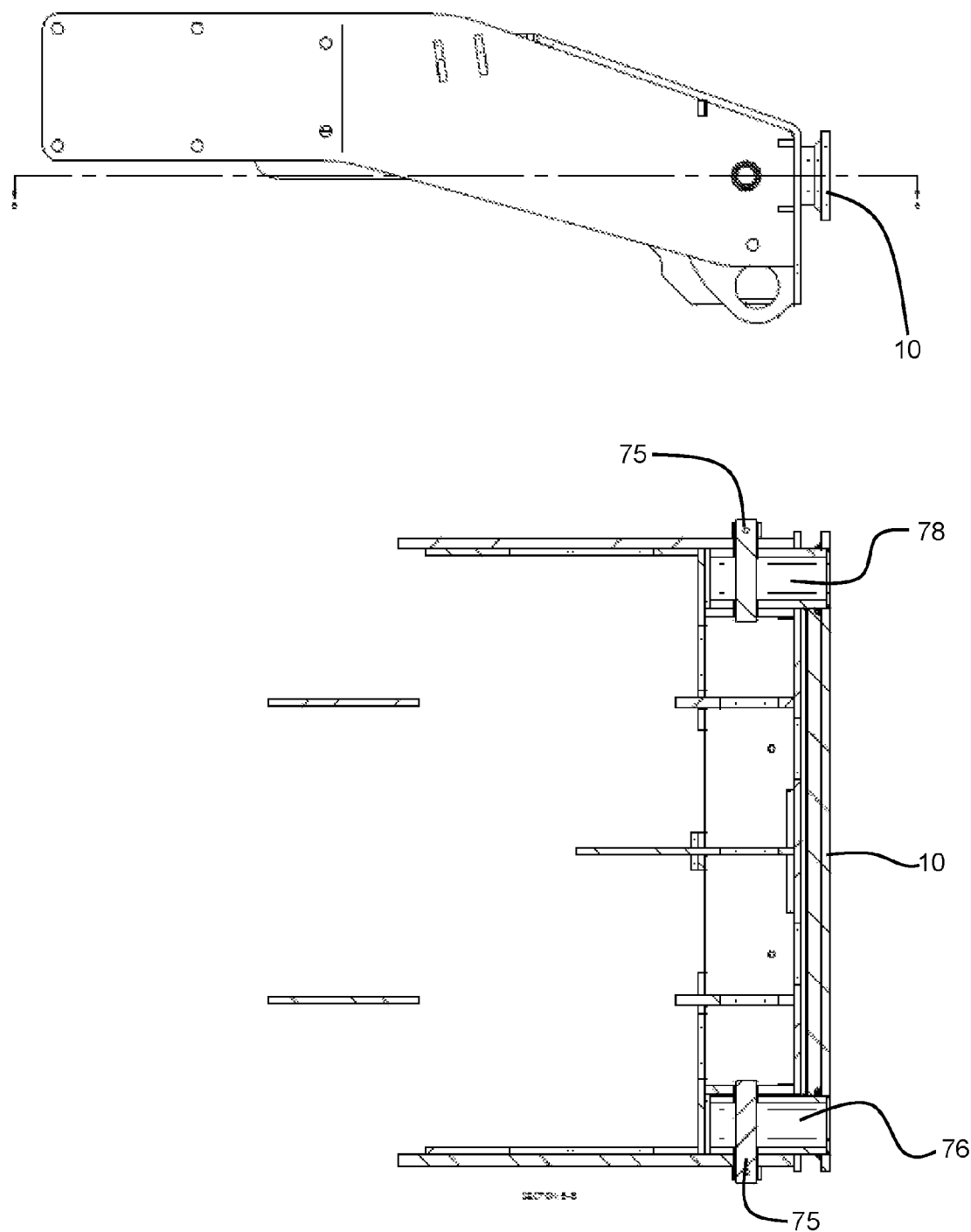
FIG. 10 is a side view and a top section view of the rear bumper of FIG. 7.
Figure 11:
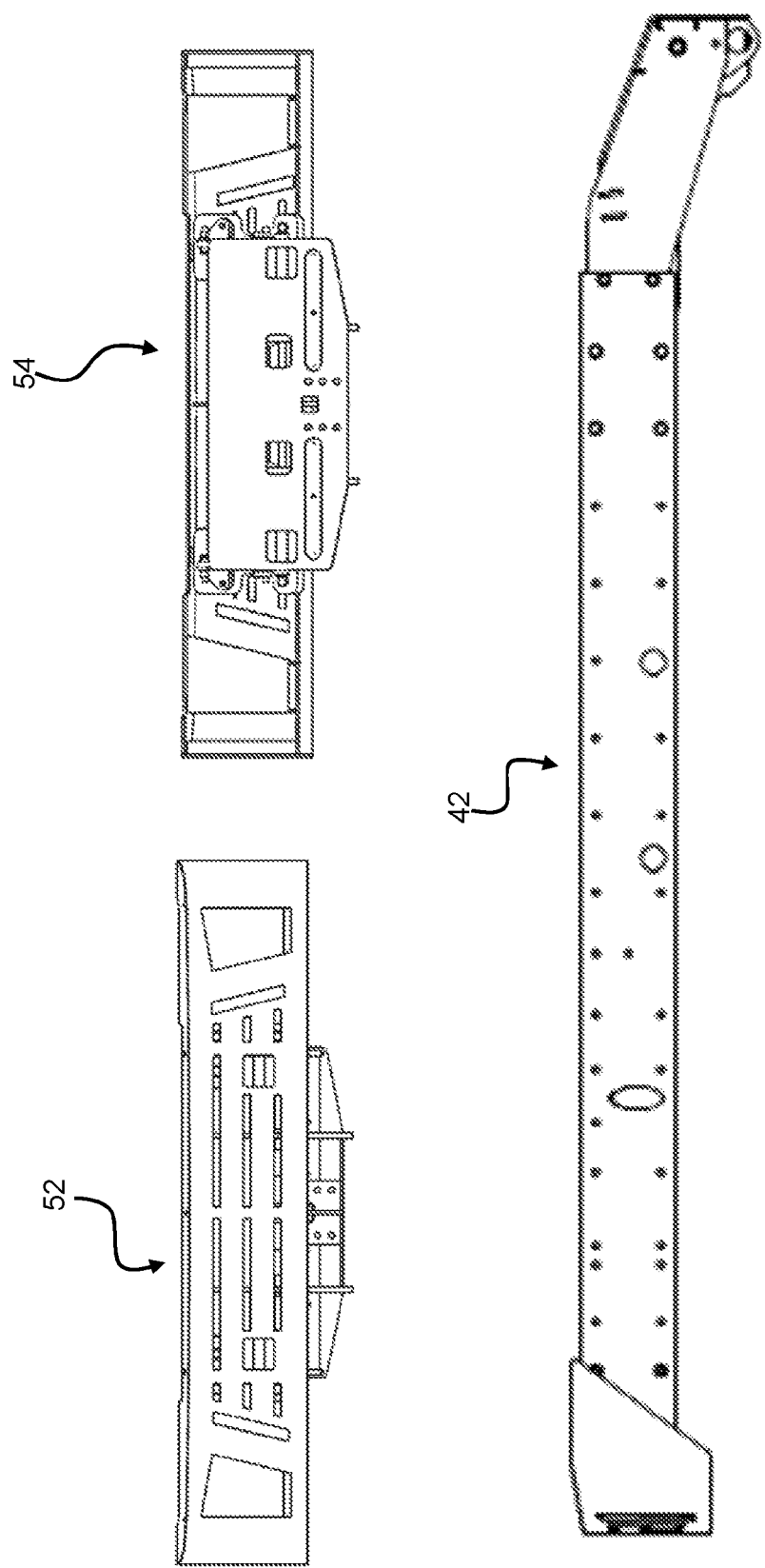
FIG. 11 is a front view, side view, and rear view of the chassis with the front and rear bumper coupled thereto.
Figure 12:
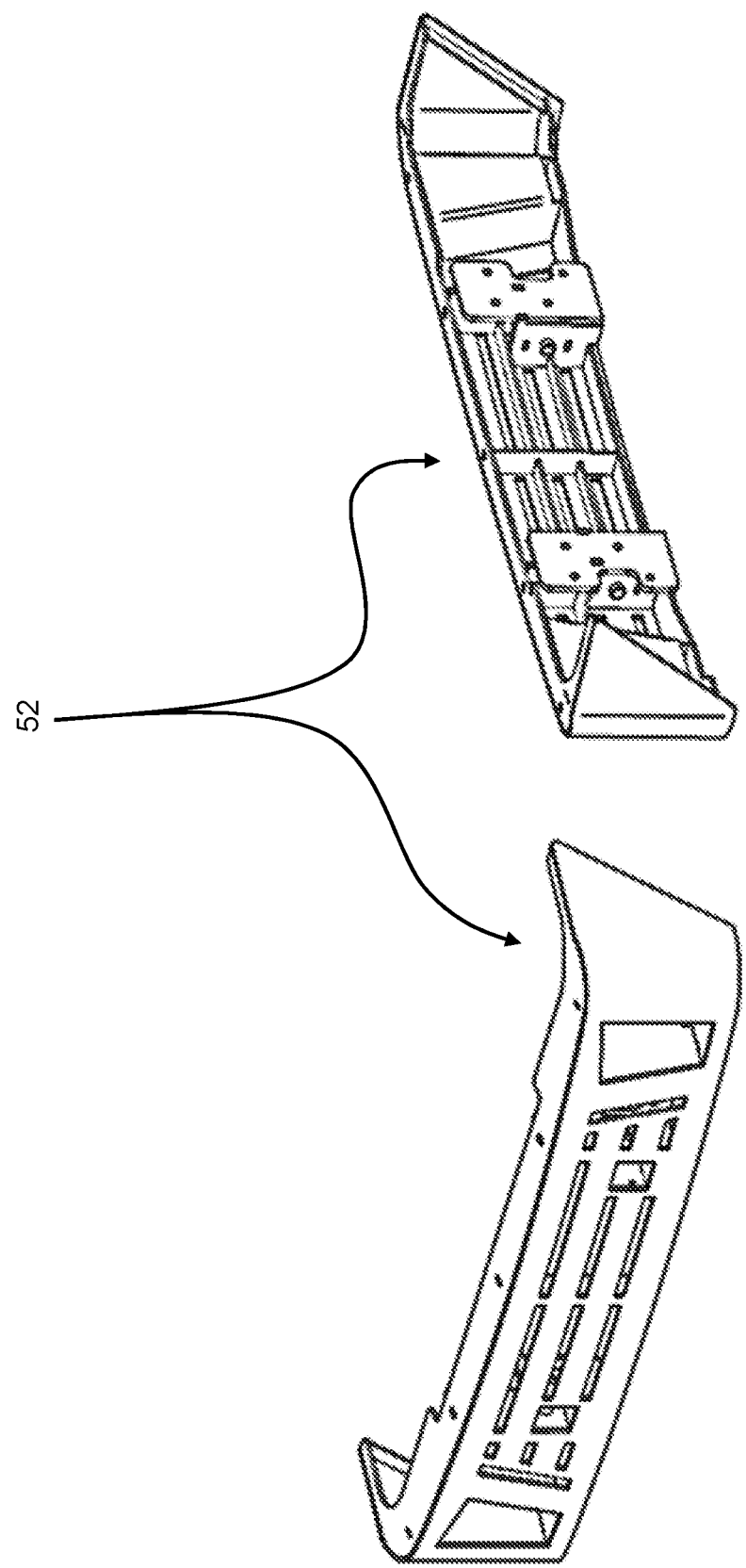
FIG. 12 is a front and rear perspective view of the front bumper isolated from the chassis.
Figure 13:
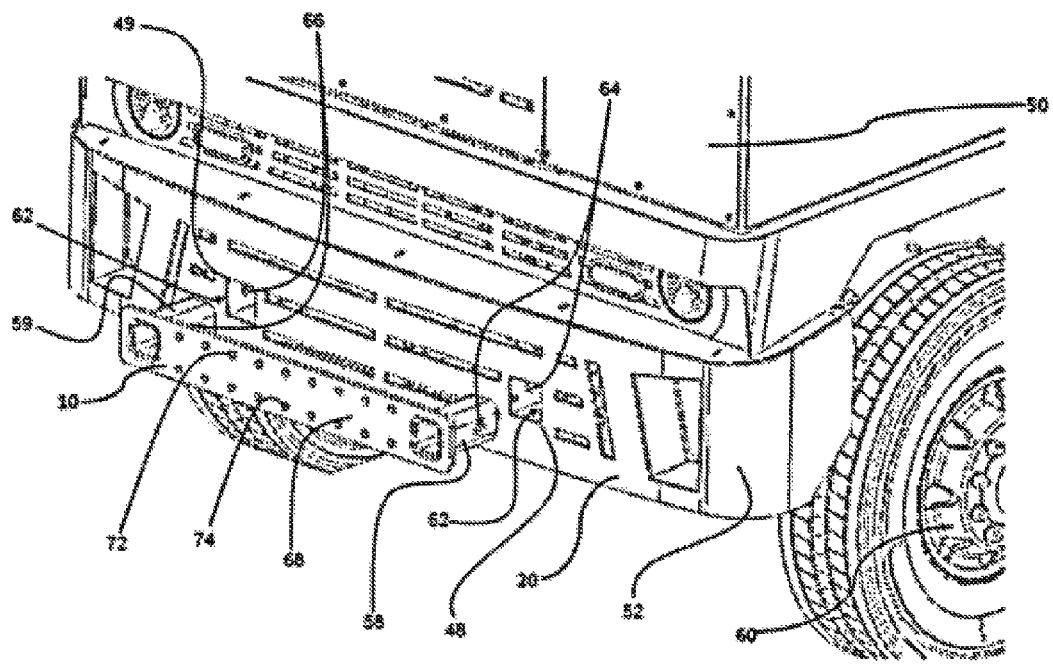
FIG. 13 is a perspective view of a forward end bumper coupled to a terminal truck and having a quick-attach mechanism.
Figure 14:
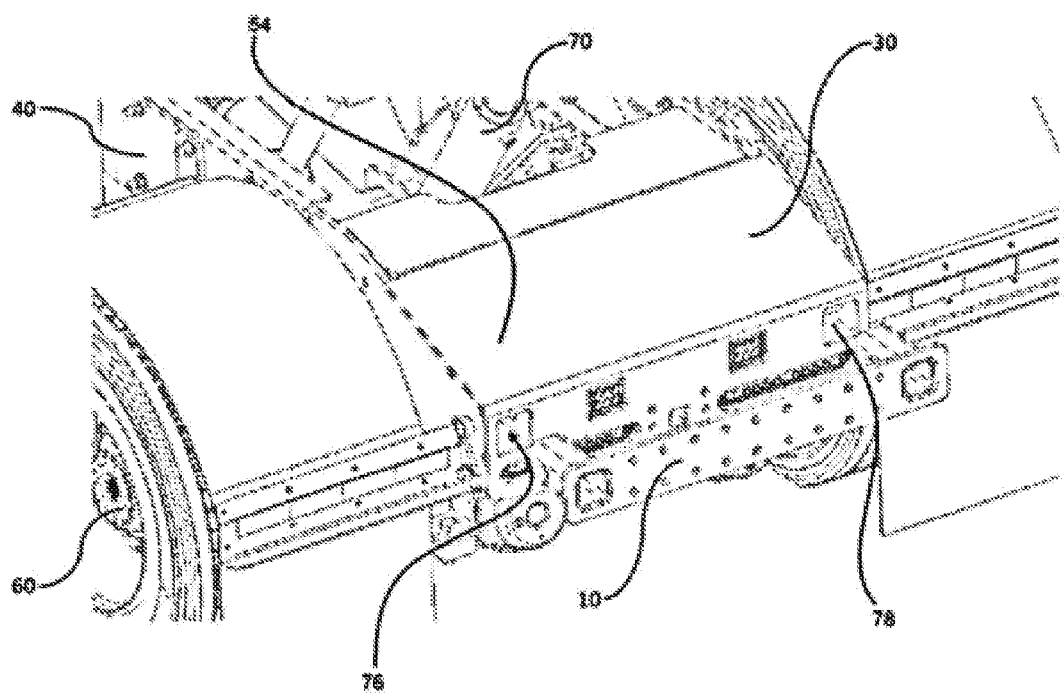
FIG. 14 is a perspective view of a rearward end bumper coupled to a terminal truck and having a quick-attach mechanism.

Referring to FIGS. 5 and 9, one example of the many different force loads addressed by the implement attachment system is shown. More specifically, in either the forward end bumper 52 (FIG. 5) or the rearward end bumper 54 (FIG. 9) may experience force inputs from an implement coupled to the coupling mechanisms 10, 20 and in turn the forward end or rearward end bumpers 52, 54. In one embodiment, the coupling mechanism 10 may experience forces in a longitudinal Y-direction 90 and a horizontal Z-direction 92 relative to the forward or rearward end bumper 52, 54. While the Y-direction 90 and the Z-direction 92 have been expressly shown, a person skilled in the art understands that the implement may also cause the coupling mechanisms 10, 20 to experience force inputs in any direction in addition to the Y-direction 90 and the Z-direction 92. More specifically, the coupling mechanisms 10, 20 would also experience forces in an X-direction that may be perpendicular to the plane of the views shown in FIGS. 5 and 9. Further, forces may act on the coupling mechanisms 10, 20 in any combination of directions described above.

In one embodiment, the male attachment mechanism 10 may be coupled to the female quick-attach mechanism 20 via one or more pin 75 positioned through openings 64, 66 in each respective coupling mechanism 10, 20. The pins 75 may restrict the male attachment mechanism 10 from moving in the Y-direction 90 away from the female quick-attach mechanism 20. Further, the male attachment mechanism 10 may slide sufficiently into the square-shaped apertures 62 to substantially restrict movement of the male attachment mechanism 10, and in turn the implement, in the Z-direction 92 or the X-direction. Accordingly, when the male attachment mechanism 10 is coupled to the female quick-attach mechanism 20 via the pins 75, the implement is substantially fixed in all direction to the chassis 42.

While one particular type of implement has been described above, many different types of implements may utilize the teachings of this disclosure. More specifically, the coupling mechanisms 10, 20 described herein may be sufficiently strong to accommodate any type of implement that may be directly coupled to the chassis of a vehicle. Accordingly, this disclosure is not limited to any particular type of implement but rather considers any implement or other device that can be coupled to the chassis or other location of a vehicle.

While an implement plate 68 has been shown and described herein, this disclosure is not limited to using an implement plate 68. Rather, this disclosure also considers mounting the first and second male members 58, 59 directly to an implement or other device. Accordingly, in another embodiment of the present disclosure the first and second male couplers may be coupled to any device that may be removably coupled to the female quick-attach mechanism 20. Further still, the female quick-attach mechanism 20, 30 may be sized and spaced in substantially the same way for both the forward end bumper 52 and the rearward end bumper 54. More specifically, the distance between the respective female quick-attach sockets may bet the same for both the forward end and rearward end bumpers 52, 54. Further still, the respective female quick-attach mechanism 20, 30 may be spaced the same distance from the underlying surface so that an implement that can be coupled to the forward end bumper 52 may also be coupled to the rearward end bumper 54 without substantial modification.

Figure 8:
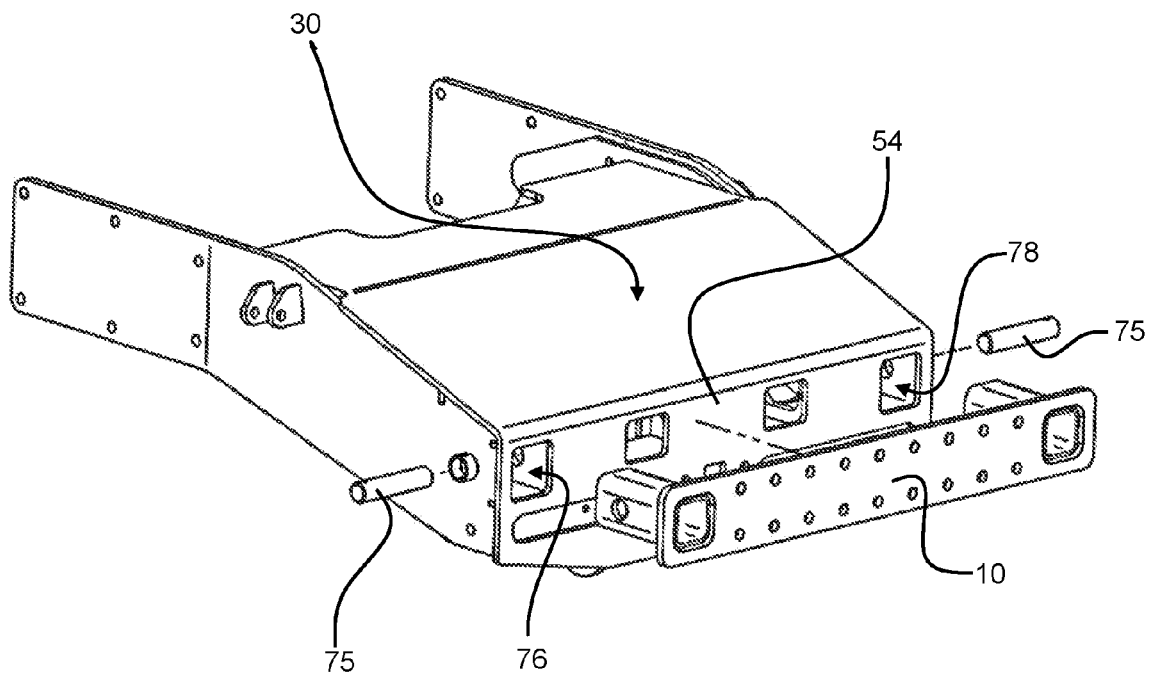
FIG. 8 is a sectional view of the rear bumper with a quick-attach mechanism spaced therefrom.

With reference to FIG. 8, an example of a male attachment mechanism 10 and the rearward end bumper 54 including the second quick-attach mechanism 30 is shown. In this embodiment, the second quick-attach mechanism 30 may have a third female quick-attach socket 76 and a fourth female quick-attach socket 78 defined therein. The third and fourth female quick-attach sockets 76, 78 may be sized and shaped in substantially the same way as a first and second female quick-attach sockets 48, 49 at the forward end bumper 52 but be defined along a rearward end of the chassis 42. Further, the third and fourth female quick-attach sockets 76, 78 may be configured to receive the male attachment mechanism 10 as described herein.

In one embodiment, shown in part in FIG. 4, the female quick-attach mechanism 20 is composed of two female sockets formed into a vehicle chassis 42 at a forward end 44 and/or a rearward end 46, allowing for the reception of a complementary male attachment mechanism 10 of one or more implement. The female quick-attach mechanism 20 may be composed of two generally square-shaped female sockets, including the first female quick-attach socket 48 and the second female quick attach socket 49. That is to say, the first and second female quick-attach sockets 48, 49 may be two generally square-shaped apertures 62 that allow for the reception of the complementary male attachment mechanism 10 of an implement (not specifically shown). That is to say, the first and second female quick-attach sockets 48, 49 may defined by a first and second side wall coupled to an upper wall and a lower wall. Further, a back wall may define the depth of the square-shaped apertures 62.

In one embodiment, the first and second male members 58, 59 may be slidably positioned within the square-shaped apertures 62 until they contact the back wall. The pin 75 may then secure the male members 58, 59 therein and they may be prevented from rotating relative to the square-shaped apertures 62 by their close proximity to the first and second side walls and the upper and lower walls. That is to say, the male members 58, 59 may be fixed to the respective female quick-attach sockets 48, 49 longitudinally via the pin 75 and/or back plate and further be fixed rotationally via interference with the first and second side walls and the upper and lower walls.

The female quick-attach sockets 48, 49 may be laterally aligned in the forward end bumper 52. In one embodiment, the forward end bumper 52 is bolted to a front section of the frame rails or chassis 42 of the tractor or like vehicle. Once the male members 58, 59 of the male attachment mechanism 10 are inserted into the respective first and second female quick-attach sockets 48, 49 or forward female receptors, the male members 58, 59 may be secured with one or more pin 75 or bolt extending through aligned respective first openings 64 and second openings 66 defined in the first and second female quick-attach sockets 48, 49 and the male members 58, 59. In one non-exclusive example, the first and second openings 64, 66 may define an axis that extends substantially parallel to the respective bumper 52, 54 and substantially parallel to the underlying surface.

In another embodiment, the rearward end mechanism is composed of two generally square-shaped female sockets 76, 78 (see FIGS. 7 and 8), or apertures, that allow for the reception of a complementary male attachment mechanism 10 of an implement attachment. The rearward end sockets are laterally aligned on the rearward end bumper 54. In one embodiment, the rearward end bumper 54 is bolted to a rear section of the frame rails or chassis 42 of the vehicle. Once the male mechanism of the attachment is inserted into the rearward female receptor, the mechanisms are secured with a pin 75 or bolt extending through aligned openings in the sockets and the male mechanism inserts.

In one nonexclusive embodiment, the female quick-attach sockets 48, 49, 76, 78 may be formed in, or otherwise coupled to, the respective forward end bumper 52 or rearward end bumper 54. The respective bumper 52, 54 may then be coupled to the chassis 42 via one or more bolts, rivets, welds, or any other coupling method known in the art. Accordingly, the female quick-attach sockets 48, 49, 76, 78 are coupled to the chassis 42 because they are integrally formed into the respective bumpers 52, 54.

In yet another embodiment, the female quick-attach sockets 48, 49, 76, 78 are not formed in, or coupled to, the respective forward or rearward end bumper 52, 54. In this embodiment, the female quick-attach sockets 48, 49, 76, 78 may instead be coupled directly to the chassis 42. Further, in this embodiment the respective bumper 52, 54 may define openings therein to allow the male attachment mechanism 10 to be coupled to the respective female quick-attach sockets 48, 49, 76, 78. The bumper 52, 54 may otherwise be a separate component from the female quick-attach sockets 48, 49, 76, 78. In other words, in one embodiment the bumper 52, 54 may not structurally support the female quick-attach sockets 48, 49, 76, 78.

In one non-exclusive example, a method of manufacturing an implement attachment system as shown and described above is disclosed herein. This embodiment may include forming the forward end bumper 52 and/or the rearward end bumper 54 as is known in the art. The respective bumper 52, 54 may be forming using any technique and material known in the art. In one example, the bumper 52, 54 is formed by bending a metal of the proper thickness into the desired form. Part of the forming the bumper step may include forming a portion of the respective first and second female quick-attach sockets 48, 49 into any one, or both, of the bumpers 52, 54. The first and second female quick-attach sockets 48, 49 may be integrally formed into the bumper 52, 54 to define the first and second square-shaped apertures 62 therein and spaced laterally from one another.

The method may include coupling each of the respective bumpers 52, 54 to the chassis 42. In one non-limiting example, the forward end bumper 52, and in turn the first female quick-attach socket 48, may be coupled to the chassis 42 through a coupler plate bolted or otherwise fastened to the driver's side frame rail 40. Similarly, the forward end bumper 52, and in turn the second female quick-attach socket 48, may also be coupled to the chassis 42 through a coupler plate bolted or otherwise fastened to the curbside frame rail 41.

The first and second female quick-attach sockets 48, 49 may be formed by a first and second side wall coupled between a top and bottom wall and extending towards a back wall as described above. Each wall may be a separate piece of material welded or otherwise coupled to the adjacent wall. Further, one material may provide several bends to define the side walls and the top and bottom walls while a separate material may be coupled thereto as the back wall. Accordingly, many different methods of forming the first and second female quick-attach sockets 48, 49 are considered herein and this disclosure is not limited to any one. Further, the respective coupler plates may be coupled to, or integrally formed with, the first and second female quick-attach sockets 48, 49 at any of the first and second side wall, top and bottom wall, back wall, or any combination thereof.

In one embodiment, the method may include aligning the first and second square-shaped apertures 62 of the bumper 52, 54 with the first and second female quick-attach sockets 48, 49 and coupling the bumper 52, 54 to the chassis of the vehicle. The above-described method can be utilized for either of the forward end bumper 52 or the rearward end bumper 54. Further, in one embodiment the above method includes forming both of the forward end bumper 52 and the rearward end bumper 54 as described above and coupling each bumper 52, 54 to the chassis 42.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An implement coupling system, comprising:
    a terminal tractor having a chassis with a forward end and a rearward end;
    a first female quick-attach socket and a second female quick-attach socket spaced laterally from one another and coupled to the chassis at the forward end; and
    a third female quick-attach socket and a fourth female quick-attach socket spaced laterally from one another and coupled to the chassis at the rearward end.

2. The implement coupling system of claim 1, wherein each of the first and second female quick-attach sockets are defined by a first and second side wall coupled to an upper wall and a lower wall.

3. The implement coupling system of claim 2, wherein each of the first and second female quick-attach sockets define a substantially square aperture.

4. The implement coupling system of claim 1, further comprising a male attachment mechanism having first and second male members spaced laterally to correspond with the respective first and second female quick-attach sockets.

5. The implement coupling system of claim 4, wherein the male attachment mechanism is coupled to the terminal tractor at the first and second female quick-attach sockets with the first and second male members.

6. The implement coupling system of claim 5, wherein the male attachment mechanism does not substantially move relative to the chassis.

7. The implement coupling system of claim 6, wherein the male attachment mechanism is coupled to an implement, the implement being any of a bucket, a fork, a grader box, or lawn maintenance equipment.

8. An implement attachment system, comprising:
    a chassis with a forward end and a rearward end; and
    a first female quick-attach socket and a second female quick-attach socket spaced laterally from one another and coupled to the chassis at the forward end or the rearward end;
    wherein the first and second female quick-attach sockets are sized to receive first and second male members;
    further comprising an implement plate coupled to, and extending between, each of the first and second male members.

9. The implement attachment system of claim 8, wherein each of the first and second female quick-attach sockets defines a substantially square-shaped aperture therein.

10. The implement attachment system of claim 8, further wherein, the first and second male members are fixed relative to the frame when the first and second male members are coupled to the respective first and second female quick-attach sockets.

11. The implement attachment system of claim 8, further comprising first and second horizontal openings defined in each of the respective first and second female quick-attach sockets, the first and second horizontal openings corresponding to openings formed in the first and second male members;
    wherein, the first and second horizontal openings of each of said first and second female quick-attach sockets are substantially aligned with the corresponding openings formed in the first and second male members when the first and second male members are coupled to the respective first and second female quick-attach sockets.

12. The implement attachment system of claim 11, further comprising a first pin selectively positionable through the first and second openings of the first female quick-attach socket and a second pin selectively positionable through the first and second openings of the second female quick-attach socket.

13. The implement attachment system of claim 8, further comprising at least one through-hole defined in the implement plate, the through-hole providing a location to couple the implement plate to an implement.

14. An implement attachment system, comprising:
    a chassis with a forward end and a rearward end;
    a first female quick-attach socket and a second female quick-attach socket spaced laterally from one another and coupled to the chassis at the forward end; wherein the first and second female quick-attach sockets are sized to receive first and second male members; and
    a third female quick-attach socket and a fourth female quick-attach socket spaced laterally from one another and coupled to the chassis at the rearward end; wherein the third and fourth female quick-attach sockets are sized to receive the first and second male members.

15. An implement attachment system, comprising:
a chassis with a forward end and a rearward end; and
a first female quick-attach socket and a second female quick-attach socket spaced laterally from one another and coupled to the chassis at the forward end or the rearward end;
wherein the first and second female quick-attach sockets are sized to receive first and second male members;
further wherein the first and second female quick-attach sockets are coupled to the chassis through a bumper.

16. A method of manufacturing an implement attachment system coupled to a chassis of a vehicle, the method comprising:
providing a bumper for a forward end or a rearward end of the vehicle, the bumper defining a first aperture and a second aperture in the bumper spaced laterally from one another;
coupling or otherwise forming a first female quick-attach socket in the bumper, the first female quick-attach socket being defined by a first and second side wall coupled between a top and bottom wall and extending towards a back wall;
coupling or otherwise forming a second female quick-attach socket in the bumper, the second female quick-attach socket being defined by a first and second side wall coupled between a top and bottom wall and extending towards a back wall; and
aligning the bumper with the chassis of the vehicle and coupling the bumper to the chassis.

17. The method of manufacturing an implement attachment system of claim 16, wherein the coupling the bumper to the chassis comprises fastening a coupler plate defined by each of the respective first and second quick-attach sockets to the chassis.

\* \* \* \* \*